United States Patent Office 2,879,838
Patented Mar. 31, 1959

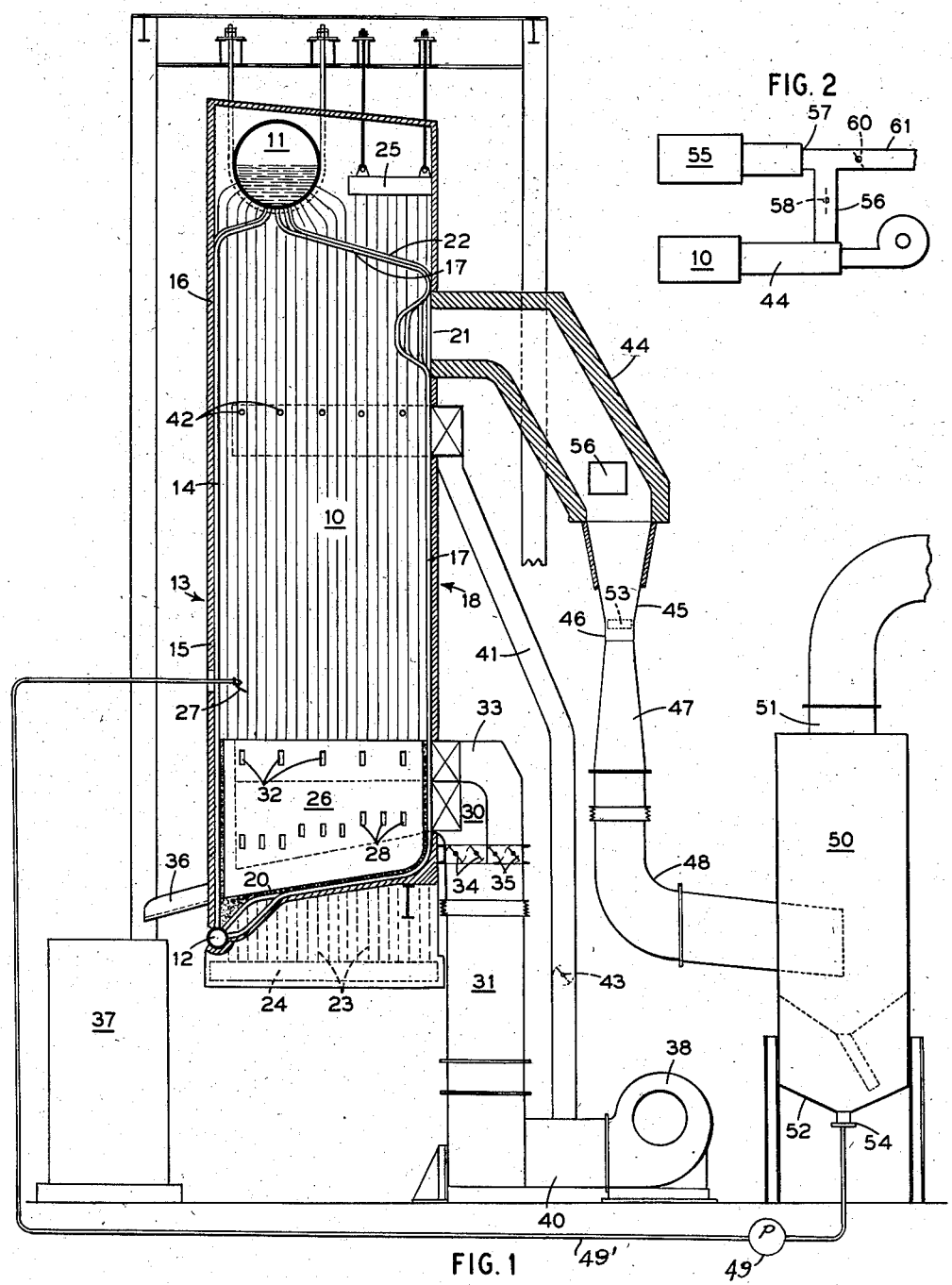

2,879,838

BY-PRODUCT AND HEAT RECOVERY FROM RESIDUAL LIQUOR

James W. Flynt, Roselle Park, N.J., and Stanley Suda, Astoria, N.Y., assignors to The Babcock & Wilcox Company, New York, N.Y., a corporation of New Jersey Application June 8, 1955, Serial No. 514,008

6 Claims. (Cl. 159—4)

The present invention relates to a method of and apparatus for the recovery of heat and chemicals from a residual liquor, and more particularly relates to the incineration of pulp residual liquor where the combustion of the liquor provides a source of heat for the concentration of the liquor prior to its incineration.

It has been customary in the chemical and heat recovery systems now in use to concentrate the residual liquor obtained from a pulp digesting process by multiple effect evaporation as well as by direct contact evaporation prior to the incineration of the liquor. In many of the smaller pulp plants the capital investment for the installation of multiple effect evaporators has not justified the installation of chemical and heat recovery apparatus. In addition the steam requirements for multiple effect evaporators in small plants has presented a continual operating cost which is difficult to justify economically.

In accordance with the present invention we have found that residual liquor, commonly available from the pulp washers of a pulp plant, can be concentrated by direct contact evaporation to a solids content sufficient to maintain self sustaining combustion, with or without the use of multiple effect evaporators. This is accomplished by concentrating the liquor in direct contact with the hot gases of combustion resulting from the incineration of the concentrated liquor. This concentration of the black liquor can advantageously be accomplished in an evaporator scrubber of the general type disclosed in U.S. Patent 2,604,185. Under some conditions it is desirable to supplement the hot gaseous products of liquor incineration by the addition of hot gases produced in a separate furnace, so that the concentrated liquor delivered to the chemical and heat recovery unit will have sufficient solids content for self-sustaining combustion.

The various features of novelty which characterize our invention are pointed out with particularity in the claims annexed to and forming a part of this specification. For a better understanding of the invention, its operating advantages and specific objects attained by its use, reference should be had to the accompanying drawings and descriptive matter in which we have illustrated and described an embodiment of our invention.

Of the drawings:

Fig. 1 is an elevation, partly in section, of a heat and chemical recovery unit constructed and arranged according to the invention; and Fig. 2 is a schematic plan view of the unit shown in Fig. 1.

In the illustrated embodiment of the invention, a fluid cooled upwardly elongated furnace 10 is provided for the incineration of residual liquor. The unit includes an upper steam and water drum 11 and a lower horizontally disposed header 12. The elongated furnace is of rectangular horizontal cross-section with the boundary walls thereof including vapor generating tubes which extend from the bottom header to the upper steam and water drum.

The front wall 13 of the furnace is substantially upright with the vapor generating tubes 14 therein covered with a layer of refractory material 15, and by the customary metallic casing 16.

The vapor generating tubes 17 included in the rear wall 18 of the furnace 10 have their lower end portions inclined downwardly from the rear wall to connect with the lower header 12 and to cooperate with a layer of plastic chrome ore 20 to form a hearth in the bottom of the furnace. The upper end portions of the rear wall are bent inwardly from the plane of the rear wall and displaced forwardly and transversely spaced to extend across a gas outlet 21 in the upper portion of the furnace 10. The rear wall tubes are inclined forwardly and upwardly from a position adjacent the upper boundary of the gas outlet to connect into the steam and water drum 11, and to form the roof 22 of the furnace.

The side walls of the furnace include upright vapor generating tubes 23 which open into a horizontally disposed lower header 24 extending completely across the front wall to rear wall depth of the furnace. One portion of the side wall tubes, adjacent the front wall 13 of the furnace, are connected at their upper ends with the upper steam and water drum 11, while the remaining portion of the side wall tubes open into an upper header 25 which in turn is connected with the water space of the upper drum 11.

In accordance with good practice the lower portions of the front, rear and side wall tubes of the furnace are covered with refractory materials to form a relatively hot lower furnace portion 26. The residual black liquor delivered to the furnace for incineration is projected across the furnace 10 from a spray nozzle 27 positioned in the front wall 13 upwardly adjacent the hot lower portion 26 of the furnace. The nozzle 27 is oscillated in a predetermined pattern to project residual liquor in spray form across the furnace 10 to impinge upon the side and rear walls thereof. The residual liquor is partially dried in transit across the furnace and in adhering to the rear and side walls is charred on the walls until it falls off and drops by gravity onto the hearth 20 at the bottom of the furnace. The residual liquor char is burned under reducing conditions on the furnace hearth by the introduction of primary air which is injected through a series of port openings 28 into the mass of char on the hearth. As shown in Fig. 1, the primary air port openings are arranged across the side walls of the furnace with preheated air delivered thereto through a duct 30 from a steam coil airheater 31.

A row of secondary air inlet ports 32 is located in the rear and side walls positioned spaced above the primary air port openings 28, with the ports 32 supplied with preheated secondary combustion air through a duct which also receives air from the steam coil airheater 31.

Since it is necessary to maintain a deficiency of oxygen in the reducing portion of the residual liquor furnace the duct 30 is provided with a set of dampers 34 for regulation of the primary air passed therethrough. The amount of secondary air delivered to the secondary air ports 32 is also controlled by dampers positioned in the duct 33, and the total amount of air delivered through both primary and secondary air ports is approximately equal to the theoretical oxygen requirements of the residual liquor.

With the char reduced and incinerated on the hearth 20, chemicals are separated from the char in the form of a molten smelt which is withdrawn through the furnace front wall 13 by a smelt spout 36. The molten smelt is discharged from the spout into a dissolving tank 37 where it is quenched and dissolved in a liquor which is withdrawn from the tank and subsequently treated for reuse in the pulp digesting process.

The combustion air used in the furnace is supplied from a forced draft fan 38 which delivers air to the steam coil airheater 31. The duct 40 connecting the forced draft fan 38 with the steam coil airheater is provided with a by-pass duct 41 which is arranged to pass a controlled quantity of ambient air or relatively low temperature tempering gas to a row of air inlet ports 42 positioned across the side walls of the furnace, downwardly adjacent the gas outlet 21. The by-pass duct is provided with a valve 43, and the amount of air delivered to the upper portion of the furnace 10 is regulated to reduce the temperature of the gases leaving the furnace 10 through outlet 21 to a value not in excess of 1250 F.

It has been found in the operation of a residual liquor furnace that high combustion temperatures cannot economically be used due to an increase of chemical losses when high temperatures are used. Excessive temperatures in the furnace lead to sublimation of chemicals, and the creation of serious dust loading problems in the subsequent cooling of the combustion gases. It is for this reason that a temperature limitation of 1250 F. has been found desirable at the gas outlet 21 from the furnace.

The gaseous products of combustion are passed through a refractory lined flue gas duct 44 which extends rearwardly of the furnace and connects with the inlet of an evaporator scrubber of the general type disclosed in United States Patent 2,604,185. As shown in the drawing, the evaporator scrubber includes a converging section 45 which is connected through a reduced cross-sectional area throat 46 with a diverging section 47 to form a venturi-like member. The gases leaving the diverging section 47 of the evaporator scrubber pass through a duct 48 to tangentially enter an upright cyclone 50. The cyclone is provided with an upper gas outlet 51 positioned centrally of the cyclone and a lower inverted frusto-conical bottom portion 52 thereof.

The throat 46 of the evaporator scrubber is supplied with a spray nozzle 53 for atomizing and introducing residual liquor into the gases passing at high velocity therethrough. In the apparatus described it is not necessary that the liquor delivered to the evaporator scrubber should be finely atomized on entering the hot stream of gases passing therethrough. It has been found that the high velocity of gas flow in passing through the throat 46 atomizes the liquor droplets into an extremely finely divided form causing intimate heat exchange contact between the liquid and the gas. The mixture of liquor and combustion gases enters the cyclone 50 at a high velocity, and in passing through the cyclone the solid and liquid matter suspended in the gases are effectively separated so that the gases leaving the cyclone through the outlet 51 are substantially clean.

The residual liquor delivered to the throat 46 of the evaporator scrubber is obtained from the pulp washers of the pulping plant, and have a normal solid content of from 15 to 20%. The liquor separated from the gases in the cyclone 50 is withdrawn from the outlet 54 in the bottom portion 52 of the cyclone by a pump 49 and is delivered to the liquor spray nozzle 27 of the furnace 10 through the pipe 49'. For most efficient separation of the gases and entrained material, the cyclone 50 may be of the wetted wall type, with some of the liquor accumulated in the bottom of the cyclone recycled to the upper portion of the cyclone for discharge to the inner surfaces of the walls thereof so as to form a liquor film thereon. When sufficient quantities of high temperature gases are passed through the apparatus, the concentrated liquor withdrawn from the cyclone 50 will have a solids content of approximately 50 to 60%, which is sufficient for sustaining combustion of the liquor in the furnace 10.

It is sometimes necessary, or desirable, to increase the flow of high temperature gases entering the throat 46 of the concentrator scrubber so as to attain adequate concentration of the residual liquor. This can be accomplished by providing for the admission of additional gases into the duct 44 leading to the inlet portion 45 of the concentrator scrubber from a separate supplementary source of hot gases. As shown in Fig. 2 the source of supplemental hot gases can be a separately fired power boiler 55 which is operated for the generation of steam by the combustion of a fuel such as gas or fuel oil. The power boiler, as shown in Fig. 2, is provided with a by-pass duct 56 leading from the breeching 57 of the boiler into the gas flow path of the gases leaving the residual liquor furnace 10. Advantageously, the flow of gases from the power boiler is regulated by adjustable dampers 58 and 60 positioned respectively in the by-pass duct 56 and in the duct 61 leading to the stack (not shown). It is within the contemplation of the present invention to provide means in the power boiler 55 for by-passing some of the heat transfer surfaces therein so that the gases discharged from the power boiler may be at a higher temperature than would ordinarily be available in the gases leaving a power boiler.

By way of example, and not of limitation, a unit of the type described will deliver approximately 54,000 pounds per hour of flue gas at 1250 F. to the evaporator scrubber, and will concentrate the residual black liquor from approximately 23.0 to 60.0% solids. Under these conditions the temperature of the flue gases leaving the cyclone separator 50 will be approximately 200 F., and approximately 5,950 pounds per hour of black liquor solids will be delivered to the furnace 10 for incineration.

While in accordance with the provisions of the statutes we have illustrated and described herein the best form of the invention now known to us, those skilled in the art will understand that changes may be made in the form of the apparatus disclosed without departing from the spirit of the invention covered by our claims, and that certain features of the invention may sometimes be used to advantage without a corresponding use of other features.

What is claimed is:

1. The process of recovering heat from residual pulp liquor which comprises the steps of burning concentrated residual liquor substantially to completion in a fluid cooled combustion zone, tempering the flue gases leaving said combustion zone to a temperature of the order of 1250° F. by mixing a cooler fluid therewith, introducing a supplementary stream of hot gases from a separate source into said tempered flue gases, injecting weak residual liquor into a high velocity stream of said tempered flue gases to evaporate moisture from said liquor and to cool said flue gases, separating entrained matter from said flue gases to collect concentrated liquor, and delivering said concentrated liquor to said combustion zone.

2. Apparatus for the incineration of residual liquor resulting from the digestion of cellulostic materials comprising walls defining a furnace having a flue gas outlet in the upper portion thereof, means for introducing concentrated residual liquor and combustion air into said furnace for the incineration of said liquor, a separate furnace for the combustion of a separate fuel, and means for concentrating the weak residual liquor from pulp digestion prior to the incineration of said liquor including a venturi-like member having a throat of reduced cross-section and a substantially uniformly converging entrance portion to receive hot gases independently but simultaneously from said furnace gas outlet and from said separate furnace, nozzle means for injecting said weak residual liquor into the hot gases passing through said venturi-like member, a substantially uniformly diverging discharge portion for said venturi-like member and a separator positioned to receive said gases and liquor from the discharge portion of said venturi-like member for the separation of suspended matter from said gases.

3. Apparatus for the recovery of heat and chemicals from the residual liquor resulting from the digestion of cellulostic materials comprising fluid cooled walls defining a substantially unobstructed furnace having a flue gas outlet in the upper portion and a smelt discharge spout in the lower portion thereof, means for introducing concentrated residual liquor and combustion air into said furnace for the incineration of said liquor with molten chemicals discharged through said smelt spout and hot gaseous products of combustion discharge through said flue gas outlet, means defining air inlet ports positioned adjacent said flue gas outlet for the controlled introduction of ambient air into said hot gases to cool the gases to a temperature not in excess of 1250° F., and means for concentrating the weak residual liquor from pulp digestion prior to its incineration including a venturi-like member having a throat of reduced cross-section constructed and arranged to receive hot gases from said furnace gas outlet, a substantially uniformly diverging discharge end portion for said venturi-like member, nozzle means for injecting said weak residual liquor into the hot gases passing through said venturi-like member, and a separator positioned to receive said gases and liquor from said venturi-like member for the separation of suspended matter from said gases.

4. Apparatus for the recovery of heat and chemicals from the residual liquor resulting from the digestion of cellulostic materials comprising walls defining a furnace having a flue gas outlet in the upper portion and a smelt discharge spout in the lower portion thereof, means for introducing concentrated residual liquor and combustion air into said furnace for the incineration of said liquor, a separately fired vapor generator, and means for concentrating the weak residual liquor from pulp digestion prior to its incineration including a venturi-like member having a throat of reduced cross-section and a substantially uniformly converging inlet end portion to receive all of the hot gases from said furnace gas outlet and independently but simultaneously a controlled amount of hot gases from said separately fired vapor generator, a duct connected with said venturi-like member for discharge of gases from said venturi-like member, nozzle means for injecting said weak residual liquor into the hot gases passing through said venturi-like member, and a separator positioned to receive said gases and entrained liquor droplets from said duct and venturi-like member for the separation of suspended matter from said gases.

5. Apparatus for the recovery of heat and chemicals from the residual liquor resulting from the digestion of cellulostic materials comprising fluid cooled walls defining an upwardly elongated furnace having a flue gas outlet in the upper portion and a hearth with a smelt discharge spout in the lower portion thereof, spray means for introducing concentrated residual liquor into said furnace for the incineration thereof, means forming a row of combustion air ports in the walls of said furnace upwardly adjacent said hearth, tempering air inlet means positioned in the walls of said furnace adjacent said flue gas outlet, and means for concentrating the weak residual liquor from pulp digestion prior to the incineration of said liquor including a venturi-like member having a throat of reduced cross-section constructed and arranged to receive hot gases from said furnace gas outlet and a diverging end portion for the discharge of said gases from said throat, nozzle means for injecting said weak residual liquor into the hot gases passing through the throat of said venturi-like member to substantially saturate the gases, a duct connected with the diverging discharge portion of said venturi-like member, and a separator spaced from said member to receive said gases and liquor from said duct for the separation of concentrated liquor from said gases.

6. The process of recovering heat from pulp residual liquor which comprises the steps of burning concentrated residual liquor substantially to completion in a substantially unobstructed fluid cooled combustion zone, cooling the gases of combustion from said concentrated liquor by radiant heat exchange with said fluid within said combustion zone, further cooling said gases of combustion before leaving said combustion zone by mixing a relatively low temperature tempering gas therewith so that said gaseous mixture leaving said combustion zone will be at a temperature not in excess of 1250° F., passing said gaseous mixture through a high velocity gas flow zone, injecting weak residual liquor into said high velocity gas flow zone to evaporate moisture from said liquor, separating the entrained matter from said gaseous mixture to collect concentrated liquor, and delivering said concentrated liquor to said combustion zone.

References Cited in the file of this patent
UNITED STATES PATENTS

| | | |
|---|---|---|
| 438,872 | Wilson et al. | Oct. 21, 1890 |
| 795,299 | Nevins | July 25, 1905 |
| 889,641 | Shipley | June 2, 1908 |
| 2,277,946 | Badenhausen | Mar. 31, 1942 |
| 2,336,833 | Badenhausen | Dec. 14, 1943 |
| 2,590,905 | Tomlinson et al. | Apr. 1, 1952 |

FOREIGN PATENTS

| | | |
|---|---|---|
| 202,312 | Great Britain | Oct. 23, 1924 |